(12) United States Patent
    Close et al.

(10) Patent No.: US 12,654,229 B1
(45) Date of Patent: Jun. 16, 2026

(54) ATTACHMENT AND METHOD FOR MACHINING GLOBE VALVES

(71) Applicant: Atlantic Hardchrome Limited, Dartmouth (CA)

(72) Inventors: Jamie Close, West Chezzecook (CA); Jamie Lohnes, Lower Sackville (CA); Teo Galovic, Wileville (CA); Mark Jean, Porters Lake (CA)

(73) Assignee: Atlantic Hardchrome Limited, Dartmouth (CA)

( * ) Notice: Subject to any disclaimer, the term of this patent is extended or adjusted under 35 U.S.C. 154(b) by 0 days.

(21) Appl. No.: 19/264,159

(22) Filed: Jul. 9, 2025

(51) Int. Cl.
    *B23C 3/05* (2006.01)
    *B23B 5/06* (2006.01)
    *B23B 27/00* (2006.01)
    *G06F 30/17* (2020.01)
    *G06F 119/18* (2020.01)

(52) U.S. Cl.
    CPC .............. *B23B 5/06* (2013.01); *B23B 27/007* (2013.01); *G06F 30/17* (2020.01); *B23B 2222/21* (2013.01); *B23C 3/05* (2013.01); *B23C 2270/18* (2013.01); *G06F 2119/18* (2020.01)

(58) Field of Classification Search
    CPC ..... B23B 5/06; B23B 27/007; B23B 2222/21; B23B 2222/04; B23B 2222/64; B23B 2222/84; G06F 30/17; G06F 2119/18; B23C 3/05; B23C 2270/18; B23C 2222/04; B23C 2222/64; B23C 2222/84
    See application file for complete search history.

(56) References Cited

FOREIGN PATENT DOCUMENTS

| CN | 117600506 | A | * | 2/2024 | ............... | B23B 5/06 |
| CN | 120079917 | A | * | 6/2025 | ............... | B23C 3/05 |

OTHER PUBLICATIONS

English translation of CN-117600506-A (Year: 2024).*
English translation of CN-120079917-A (Year: 2025).*
Maritime Industrial Base Program, Advanced Manufacturing Milestone, post on Linkedin dated Jun. 2025. <https://www.linkedin.com/posts/maritimeindustrialbase_advancedmanufacturing-additivemanufacturing-activity-7338536784764510208-WE5h?Utm_source=li_share&utm_content=feedcontent&utm_medium=g_dt_web&utm_campaign=copy>.

* cited by examiner

*Primary Examiner* — Jun S Yoo
(74) *Attorney, Agent, or Firm* — Robinson + Cole LLP

(57) ABSTRACT

A method for CNC machining internal structures of globe valves from solid forged NAB includes providing a globe valve design that includes an internal structure sized such that standard CNC machining turning and milling tools are geometrically incapable of machining the internal structure. The method also includes creating a custom CNC machining turning or milling tool corresponding to the globe valve design, which includes an arm, a branch connected to the arm and substantially perpendicular to the arm, and a tip connected to a distal end of the branch. The method further includes providing a piece of solid forged NAB and CNC machining the one or more openings and the internal structure of the globe valve design from the piece of solid forged NAB using standard CNC machining turning or milling tools and the custom CNC machining turning or milling tool corresponding to the globe valve design.

20 Claims, 3 Drawing Sheets

200

| | |
|---|---|
| 205 | Acquire Forged Material |
| 210 | Provide Design To CNC Machine |
| 215 | Begin Shaping Material |
| 220 | Utilize Attachment To Machine Interior |

300

305

310

315

320

ATTACHMENT AND METHOD FOR MACHINING GLOBE VALVES

FIELD

The present disclosure relates to a method of machining a globe valve. More particularly, the present disclosure relates to a custom attachment for a milling/turning machine used to manufacture a globe valve.

BACKGROUND

A globe valve is a type of flow control valve. As shown in FIG. 1, the globe value 100 may include an inlet 105 to a first passage 110 and an outlet 115 to a second passage 120. The first passage 110 may extend in a slightly upward direction from the inlet 105 and the second passage 120 may extend in a slightly downward direction from the outlet 115 so that in the middle of the globe valve 100 the first passage 110 is superior to the second passage 120. An aperture 125 with a seat 130 may be positioned between the passages 110, 120. A plug (not shown) may selectively engage the seat 130 to limit flow through the passages 110, 120.

A globe valve 100 may be constructed from a metallic material to have the sufficient strength to resist the internal pressure of fluid passing through the valve. In some examples, a combination of Nickel, Aluminum, and Bronze (NAB) may be used to construct the valve 100. Traditionally, a casting process may be used to form the valve 100 from NAB. Alternatively, the valve 100 may be produced using additive manufacturing or 3D printing. A variance of tolerance may occur when a valve is manufactured using either method, which may prevent the plug from adequately engaging the seat 130 and blocking fluid flow between the passages 110, 120. Additionally, it may be difficult to create globe valves with sufficient structural integrity using such methods. Because of the internal geometry of the valve 100, it was not known to machine the manufactured part to the appropriate tolerances.

Additionally, NAB is susceptible to selective phase corrosion (SPC), which is a type of corrosion where one specific phase within the material corrodes preferentially due to its different electrochemical properties compared to the other phases, typically leading to localized corrosion along the phase boundaries. In NAB, this usually means the copper-rich a phase corrodes faster than the harder K phase when exposed to a corrosive environment like seawater. When manufacturing by casting or additive machining, an extensive post heat process must be done to help prevent SPC from occurring. A need exists for a way to avoid these issues when manufacturing globe valves.

SUMMARY

Various examples of the present disclosure can overcome various of the aforementioned and other disadvantages associated with known methods and offer new advantages as well.

In some forms, a custom milling or turning tool includes a body, a stem that extends from the body, and a branch that extends from the stem. The stem and the branch include an elliptical or partially elliptical shape.

In some forms, an attachment for a computer numerical control (CNC) machine includes a body with a substantially cylindrical shape, an arm, a branch, and a tip. The body includes a first end that can connect to the CNC machine and a second end opposite to the first end. The arm includes a third end connected to the second end and a fourth end opposite to the third end. The arm and the body extend along a first axis. The branch includes a fifth end connected to the fourth end and a sixth end opposite to the fifth end. The branch extends along a second axis inclined with respect to the first axis. The tip is connected to the sixth end. The tip extends further from the distal end of the branch.

In some forms, a method for machining a globe valve includes creating a custom milling tool and machining a piece of material using the custom milling tool. For the avoidance of doubt, where the term "milling" is used herein without "turning", it should be understood to include milling and/or turning, e.g., a "milling tool" as used herein encompasses a milling and/or turning tool.

In some forms, a method for CNC machining internal structures of globe valves from solid forged NAB includes providing a globe valve design that includes an internal structure and one or more openings. The one or more openings and the internal structure of the globe valve design are sized such that standard CNC machining turning and milling tools are geometrically incapable of machining the internal structure of the globe valve design through the one or more openings of the globe valve design. The method also includes creating a custom CNC machining turning or milling tool corresponding to the globe valve design. The custom CNC machining turning or milling tool includes an arm, a branch connected to the arm and substantially perpendicular to the arm, and a tip connected to a distal end of the branch. The tip extends further from the distal end of the branch. The method further includes providing a piece of solid forged NAB and CNC machining the one or more openings and the internal structure of the globe valve design from the piece of solid forged NAB using standard CNC machining turning or milling tools and the custom CNC machining turning or milling tool corresponding to the globe valve design.

In some forms, there is a method for computer numerical control (CNC) machining internal structures of globe valves from a solid piece of forged metal. A globe valve design is provided that includes an internal structure and one or more openings. The one or more openings and the internal structure of the globe valve design are sized and shaped such that standard CNC machining turning and milling tools are geometrically incapable of machining the internal structure of the globe valve design through the one or more openings of the globe valve design. A custom CNC machining turning or milling tool is created that corresponding to the globe valve design. The custom CNC machining turning or milling tool includes an arm and a branch connected to the arm. The solid piece of forged metal is provided and treated to limit selective phase corrosion. The internal structure of the globe valve design is CNC machined to create the one or more openings and from the solid piece of forged metal using standard CNC machining turning or milling tools and the custom CNC machining turning or milling tool corresponding to the globe valve design. An outer shape of the globe valve design is CNC machined using a standard CNC machining turning or milling tool from the piece of solid forged NAB corresponding to the globe valve design. The standard CNC machining turning or milling tool extends along a single axis. The standard CNC machining turning or milling tool is replaced with the custom CNC machining turning or milling tool. The one or more openings and the internal structure of the globe valve design are CNC machined from the piece of solid forged NAB using the custom CNC machining turning or milling tool corresponding to the globe valve design.

In some forms, there is a method for computer numerical control (CNC) machining internal structures of globe valves from solid forged nickel, aluminum, bronze (NAB). A first 3D model of a globe valve design is provided that includes an internal structure and one or more openings. The first 3D model is analyzed to create a second 3D model of a custom CNC machining turning or milling tool. The custom CNC machining turning or milling tool includes an arm, a branch connected to the arm at a first angle, and a tip connected to a distal end of the branch. The tip extends further from the distal end of the branch. The custom CNC machining turning or milling tool is manufactured using the second 3D model. A piece of solid forged NAB is provided.

The disclosure herein should become evident to a person of ordinary skill in the art given the following enabling description and drawings. The drawings are for illustration purposes only and are not drawn to scale unless otherwise indicated. The drawings are not intended to limit the scope of the disclosure. The following enabling disclosure is directed to one of ordinary skill in the art and presupposes that those aspects within the ability of the ordinarily skilled artisan are understood and appreciated.

BRIEF DESCRIPTION OF THE DRAWINGS

Various aspects and advantageous features of the present disclosure will become more apparent to those of ordinary skill when described in the detailed description of preferred examples and reference to the accompanying drawing wherein.

DETAILED DESCRIPTION

Figure 1:
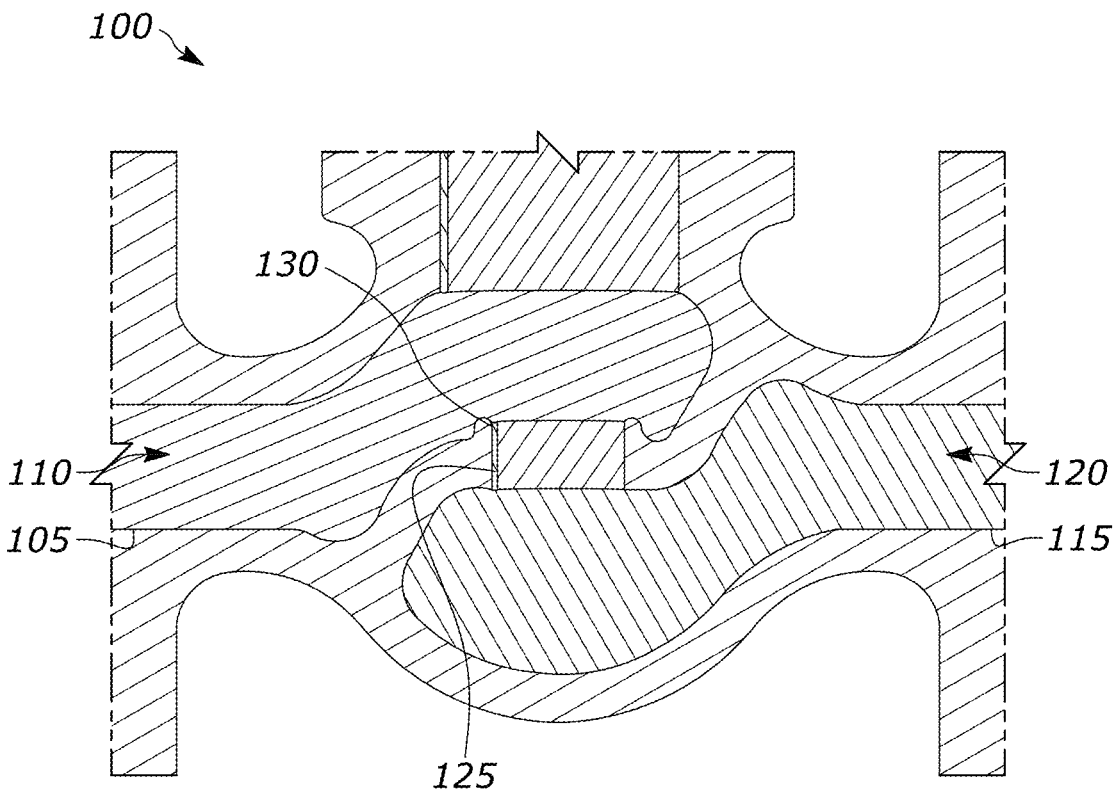
FIG. 1 is a cross-sectional view of a globe valve.

To address issues with current manufacturing techniques, globe valves may be manufactured using a turning and/or milling process. This disclosure specifically relates to a computer numerical control (CNC) process, although a person having ordinary skill in the art would understand that any similar manufacturing process may be used. As described in more detail below, the CNC machining process may produce a globe valve with more precise tolerances As shown in FIG. 1, the process 200 of manufacturing a globe valve 100 may begin with acquiring a forged piece of NAB 205. In other words, the NAB may be in a standard shape (e.g., a sphere, a cylinder, a cube, etc.) and not in the shape of a globe valve 100. The NAB may undergo SPC treatment during the forging process, and may not require additional SPC treatment later while the globe valve 100 is manufactured.

Next, the CNC machine is used to begin shaping the forged piece of NAB into a shape of the globe valve 100. For example, a design (e.g., a 3D model) for a globe valve 100 may be provided to the CNC machine 210. More specifically a processor of the CNC machine may receive the desired dimensions of the finished globe valve, which can be used to program the machine to complete the manufacturing operation.

The CNC machine may then shape 215 the forged piece of NAB into a design that resembles the globe valve 100. More specifically, the CNC machine may remove sections of the forged piece of NAB in accordance with the design provided to the processor. The remaining unremoved sections may be shaped as the globe valve 100.

Using a traditional CNC machine may form the general shape of the globe valve 100. In other words, the traditional CNC machine may be capable of manufacturing the desired outer geometry of the globe valve 100. However, the traditional CNC machine may be incapable of machining the specific internal geometry of the globe valve to the tolerances specified in the design provided to the processor 210. For example, the CNC machine may be unable to extend within the inlet 105 or outlet 115 to manufacture the first passage 110, the second passage 120, the aperture 125, and/or the seat 130.

Figure 3:
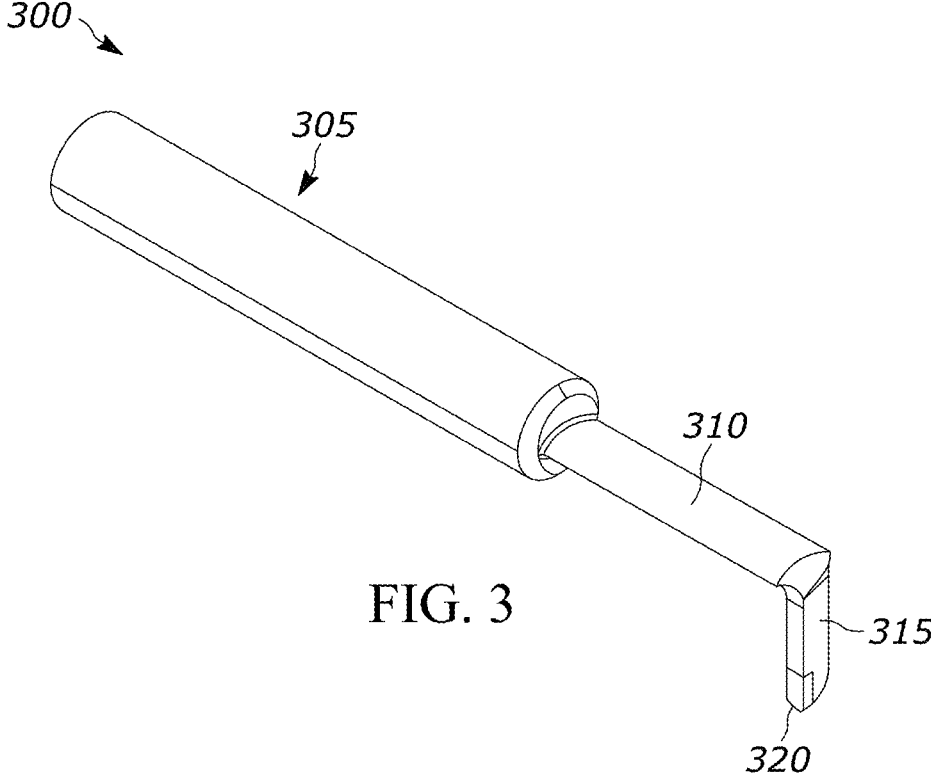
FIG. 3 is a perspective view of a tool for use in manufacturing a globe valve.
Figure 4:
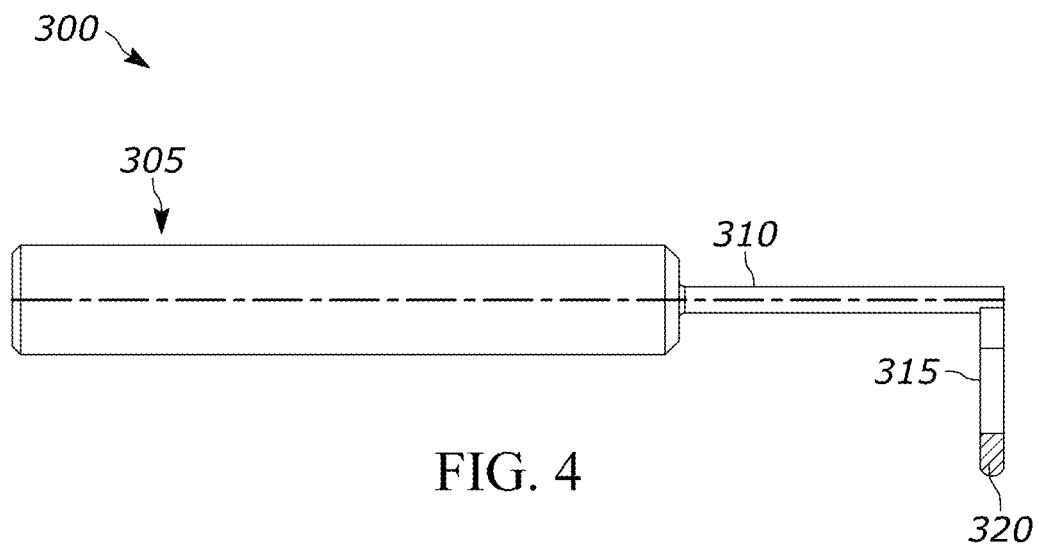
FIG. 4 is a side view of the tool of FIG. 3.
Figure 5:
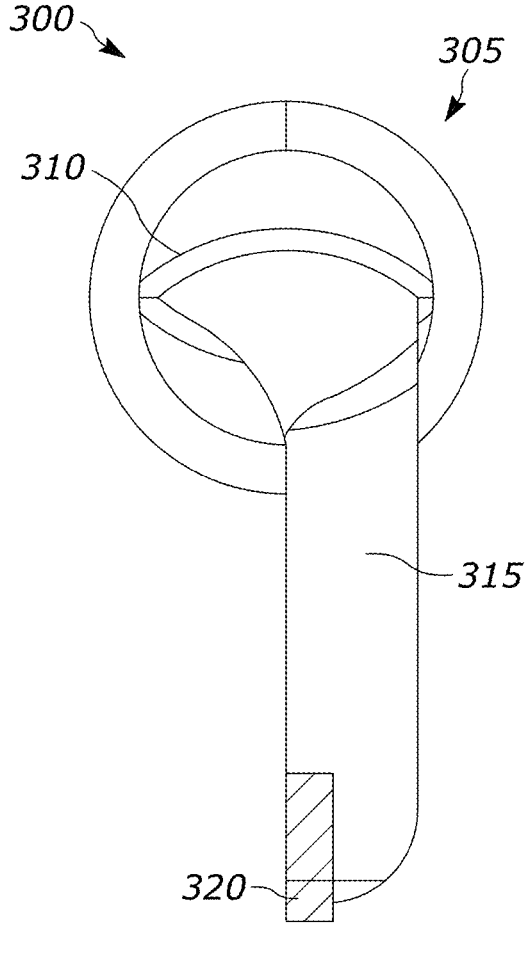
FIG. 5 is a front view of the tool of FIG. 3.

As shown in FIGS. 3 to 5, an attachment 300 for a CNC machine may be used to machine the globe valve 100 and specifically to access the internal areas of the valve 100. As described in more detail below, the attachment 300 may be used to machine the entire globe valve 100 or it may be used only to manufacture the internal areas that the traditional CNC machine attachment cannot access. The attachment 300 may be constructed from a rigid material (e.g., steel). The attachment 300 may have a different shape than a standard CNC attachment (e.g., a linear attachment that extends along a single axis).

As shown in FIGS. 3 and 4, the attachment 300 may include an elongated body 305. In the illustrated example, the body 305 may include a substantially cylindrical shape, although other shapes may be used in other examples.

In some forms, a stem or arm 310 may extend from an end of the body 305. The illustrated stem 310 may also be elongated but may have a different shape than the body 305. For example, the stem 310 may be narrower than the body 305. This may assist the attachment 300 to reach within the NAB material to form the internal elements of the valve 100.

As shown in FIG. 5, certain forms of the stem 310 may have a substantially elliptical shape. In some forms, the elliptical shape of the stem 310 may allow for an increased length while maintaining the rigidity in the stem 310. For example, the stem 310 may be formed as part of a cantilever member with the fixed end coupled to the body 305. The stem 310 may include a length (e.g., a distance between the fixed and free ends) that is sufficient to achieve the machining reach needed for manufacturing the globe valve 100. The elliptical shape may provide increased rigidity so that the elongated stem 310 is sufficiently supported.

With continued reference to FIG. 5, a branch 315 may extend from a second end of the stem 310. In the illustrated example, the branch 315 may be oriented substantially perpendicular to the stem 310. However, other examples may include the branch 315 and stem 310 oriented at a different example.

In some forms, the branch 315 may have a similar shape as the stem 310. For example, the branch 315 may have an elliptical shape that may provide increased rigidity. The elliptical shape of the branch 315 may help provide a reduced thickness of the branch 315. The reduced thickness of the branch 315 may permit a further range of motion to machine the geometry of the globe valve 100.

In some forms, a carbide tip 320 (e.g., steel carbide) may be coupled to a free end of the branch 315 (e.g., opposite to an end coupled to the stem 310). The carbide tip 320 may be used to machine portions from the NAB material.

Figure 2:
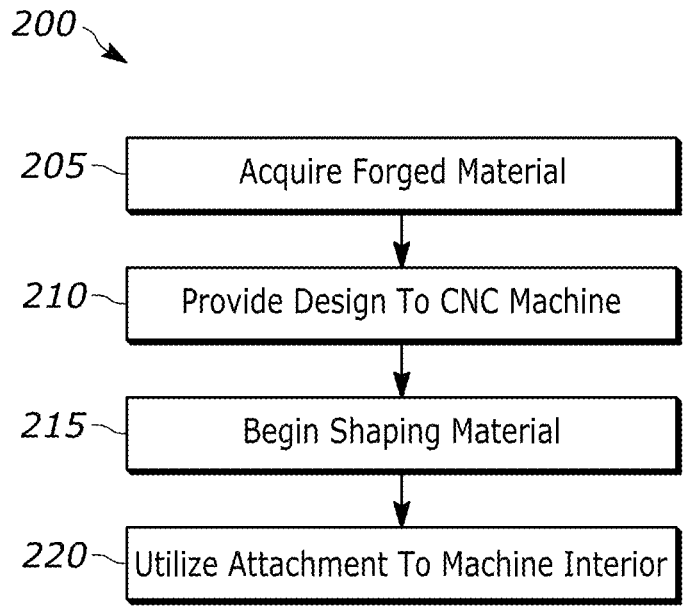
FIG. 2 is a schematic view illustrating

Returning to FIG. 2, the attachment 300 may be used to continue machining the NAB into the globe valve 100. More particularly, the attachment 300 may be used to machine the interior geometry 220 of the globe valve 100. As described previously, the attachment 300 may be used during the entirety of the CNC machining process or the attachment 300 may be used specifically to machine the interior geometry (e.g., a standard CNC attachment may be used to manufacture the outer geometry). Using the provided design 210, the CNC machine may use the attachment to shape the interior of the globe valve 100 to the specified tolerances.

When the CNC machining process is completed, further treatment to the completed globe valve 100 may not be needed. For example, because the initial forged piece of NAB underwent SPC treatment, further treatment is not required on the completed part. This may be better than other forms of manufacture where treatment is required after the part is formed and may be unable to access and fully treat the internal sections of the globe valve 100. In some forms, the globe valves 100 may be used in corrosive environments (e.g., in salt water for use in a submarine) where it is important that the entirety of the globe valve 100 is properly treated to limit failure of the part. The valves could also be used in other applications (e.g., power generation stations like coal, hydro, nuclear, etc.).

In some forms, the attachment 300 may include dimensions that are specific for manufacturing a specific globe valve 100. In other words, the dimensions of the attachment 300 may change depending on the size and shape of the desired globe valve 100 to allow the specific tool to mill or shape the specific internal geometry and permit the specific attachment 300 to reach the internal geometry of the individual globe valve 100. For example, the model and/or dimensions for the globe valve 100 that are provided to the processor may be used to manufacture the attachment 300. The processor may calculate one or more dimensions that will maximize the ability of the attachment 300 form the internal shape of the globe valve 100. This permits the attachment 300 to be custom manufactured for a specific sized globe valve 100, and helps ensure that each attachment 300 is manufactured to maximize an internal reach to form the globe valve 100.

In certain examples, the attachment 300 may be manufactured to be adjustable (e.g., the stem 310 and/or branch 315 are telescopic) to permit changes in dimensions. For example, the attachment 300 may be a standard part that is manufactured with an adjustment mechanism. The processor may use the model and/or dimensions of the globe valve 100 to determine the specific adjustment(s) that are needed to be made to the attachment 300 to produce the specific globe valve 100 (e.g., elongating or shortening one or more parts of the attachment 300). This may permit a single attachment 300 to be used to manufacture globe valves 100 of different sizes.

In some forms, the shape and size of the attachment 300 may be determined by the specific design of the globe valve 100. For example, a design for a specific globe valve 100 may be provided to a processor, which analyzes the design and the capabilities of the tool (e.g., a CNC machine) that will be used to create the globe valve 100. Based on this information, the processor may provide dimensions for the specific attachment 300 needed to create the globe valve 100 so that the attachment 300 may be produced before the forge piece of NAB is machined. In certain forms, this analysis may the dimensions of the internal geometry of the desired globe valve 100 and may recommend specific dimensions and/or shapes for an attachment 300 best suited to produce that internal design.

One of ordinary skill will appreciate that the exact dimensions and materials are not critical to the disclosure and all suitable variations should be deemed to be within the scope of the disclosure if deemed suitable for carrying out the objects of the disclosure.

One of ordinary skill in the art will also readily appreciate that it is well within the ability of the ordinarily skilled artisan to modify one or more of the constituent parts for carrying out the various examples of the disclosure. Once armed with the present specification, routine experimentation is all that is needed to determine adjustments and modifications that will carry out the present disclosure.

The above examples are for illustrative purposes and are not intended to limit the scope of the disclosure or the adaptation of the features described herein. Those skilled in the art will also appreciate that various adaptations and modifications of the above-described preferred examples can be configured without departing from the scope and spirit of the disclosure. Therefore, it is to be understood that, within the scope of the appended claims, the disclosure may be practiced other than as specifically described.

What is claimed is:

1. A method for computer numerical control (CNC) machining internal structures of globe valves from solid forged nickel, aluminum, bronze (NAB), comprising:
   providing a globe valve design comprising an internal structure and one or more openings, wherein the one or more openings and the internal structure of the globe valve design are configured such that standard CNC machining turning and milling tools are geometrically incapable of machining the internal structure of the globe valve design through the one or more openings of the globe valve design;
   creating a custom CNC machining turning or milling tool corresponding to the globe valve design, wherein the custom CNC machining turning or milling tool comprises an arm, a branch connected to the arm in a perpendicular orientation, and a tip connected to a distal end of the branch, wherein the tip extends further from the distal end of the branch;
   providing a piece of solid forged NAB; and
   CNC machining the one or more openings and the internal structure of the globe valve design from the piece of solid forged NAB using the standard CNC machining turning or milling tools and the custom CNC machining turning or milling tool corresponding to the globe valve design.

2. The method of claim 1, wherein the arm of the CNC machining turning or milling tool has a length and a shape, the branch of the CNC machining turning or milling tool has a length and a shape, and the tip of the CNC machining turning or milling tool has a length and a shape, and wherein the step of creating the custom CNC machining turning or milling tool comprises customizing one or more of the length of the arm, the shape of the arm, the length of the branch, the shape of the branch, the length of the tip, and the shape of the tip to correspond to the globe valve design.

3. The method of claim 1 further comprising: creating a 3D model of the globe valve design to design the custom CNC machining turning or milling tool.

4. The method of claim 1, wherein the tip of the custom CNC machining turning or milling tool comprises steel carbide.

5. The method of claim 1, wherein the globe valve design is configured for use on military, naval, or nuclear applications.

6. The method of claim 5, wherein the globe valve design is configured for use on a submarine.

7. The method of claim 1, further comprising treating the piece of solid forged NAB to limit selective phase corrosion before CNC machining the one or more openings and the internal structure of the globe valve design.

8. The method of claim 1, wherein the branch includes a profile with an elliptical shape.

9. A method for computer numerical control (CNC) machining internal structures of globe valves from a solid piece of forged metal, comprising:

providing a globe valve design comprising an internal structure and one or more openings, wherein the one or more openings and the internal structure of the globe valve design are configured such that standard CNC machining turning and milling tools are geometrically incapable of machining the internal structure of the globe valve design through the one or more openings of the globe valve design;

creating a custom CNC machining turning or milling tool corresponding to the globe valve design, wherein the custom CNC machining turning or milling tool comprises an arm and a branch connected to the arm;

providing the solid piece of forged metal;

treating the solid piece of forged metal to limit selective phase corrosion; and CNC machining the one or more openings and the internal structure of the globe valve design from the solid piece of forged metal using the standard CNC machining turning or milling tools and the custom CNC machining turning or milling tool corresponding to the globe valve design.

10. The method of claim 9, wherein the solid piece of forged metal is constructed from nickel, aluminum, and bronze (NAB).

11. The method of claim 9, wherein the branch is oriented perpendicularly with respect to the arm.

12. The method of claim 9, wherein a tip is connected to and extends beyond a distal end of the branch, and wherein the tip is constructed from steel carbide.

13. The method of claim 9, wherein the branch includes a profile with an elliptical shape.

14. The method of claim 9, further comprising, analyzing a 3D model of the globe valve design;

creating a 3D model of the custom CNC machining turning or milling tool based off of the 3D model of the globe valve design;

wherein the custom CNC machining turning or milling tool is created based off of the 3D model of the custom CNC machining turning or milling tool.

15. The method of claim 9, wherein the globe valve design is configured for use on a submarine.

16. A method for computer numerical control (CNC) machining internal structures of globe valves from solid forged nickel, aluminum, bronze (NAB), comprising:

providing a first 3D model of a globe valve design comprising an internal structure and one or more openings;

analyzing the first 3D model to create a second 3D model of a custom CNC machining turning or milling tool, wherein the custom CNC machining turning or milling tool comprises an arm, a branch connected to the arm at a first angle, and a tip connected to a distal end of the branch, wherein the tip extends further from the distal end of the branch;

manufacturing the custom CNC machining turning or milling tool using the second 3D model;

providing a piece of solid forged NAB;

CNC machining an outer shape of the globe valve design using a standard CNC machining turning or milling tool from the piece of solid forged NAB corresponding to the globe valve design, wherein the standard CNC machining turning or milling tool extends along a single axis;

replacing the standard CNC machining turning or milling tool with the custom CNC machining turning or milling tool; and CNC machining the one or more openings and the internal structure of the globe valve design from the piece of solid forged NAB using the custom CNC machining turning or milling tool corresponding to the globe valve design.

17. The method of claim 16, further comprising treating the piece of solid forged NAB to limit selective phase corrosion before CNC machining the one or more openings and the internal structure of the globe valve design.

18. The method of claim 16, wherein the branch includes a profile with an elliptical shape.

19. The method of claim 16, wherein the branch is oriented perpendicularly with respect to the arm.

20. The method of claim 16, wherein the arm of the custom CNC machining turning or milling tool has a length and a shape, the branch of the custom CNC machining turning or milling tool has a length and a shape, and the tip of the custom CNC machining turning or milling tool has a length and a shape, and wherein the step of creating the custom CNC machining turning or milling tool comprises customizing one or more of the length of the arm, the shape of the arm, the length of the branch, the shape of the branch, the length of the tip, and the shape of the tip to correspond to the globe valve design.

* * * * *